Patented May 19, 1931

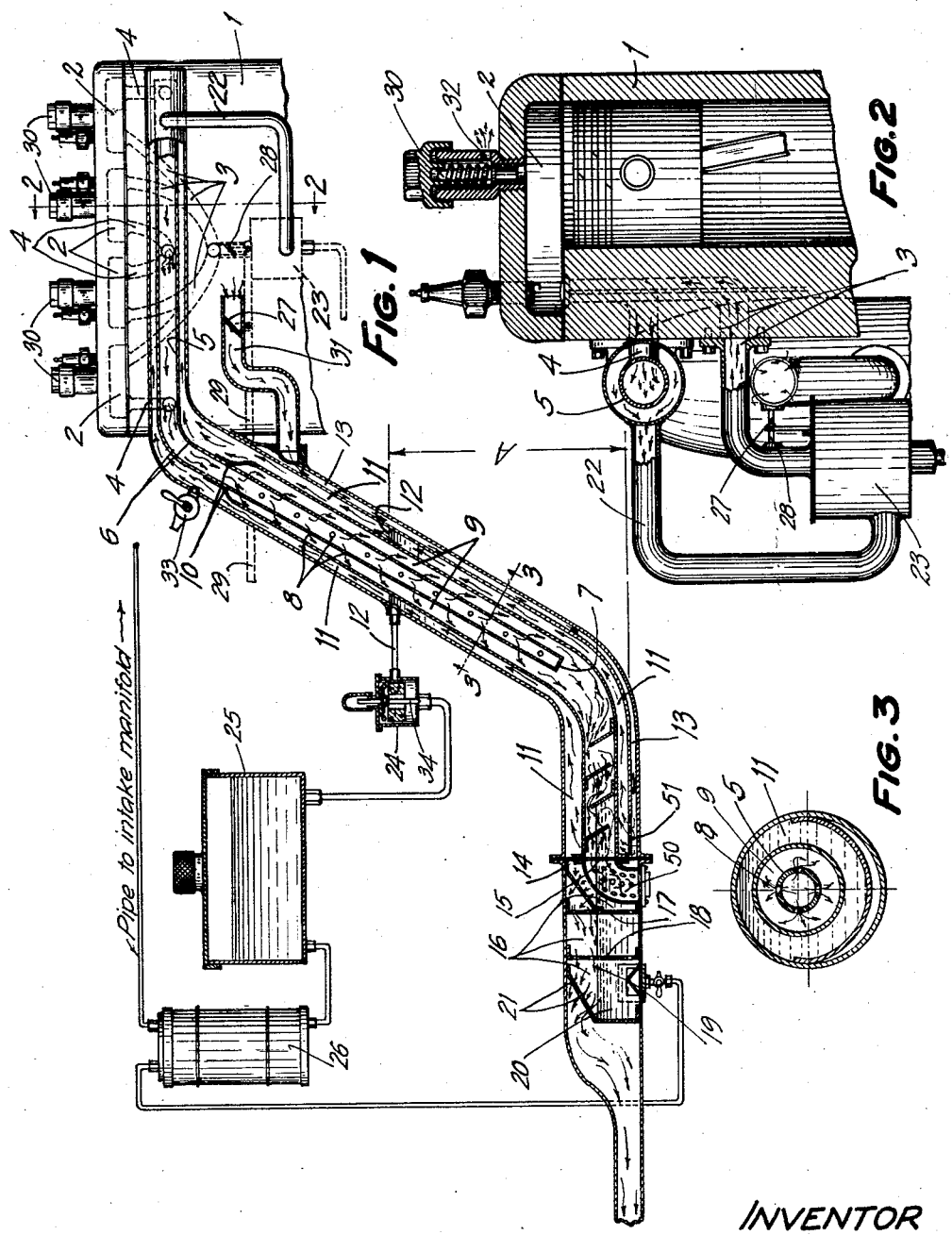

1,805,644

UNITED STATES PATENT OFFICE

GEORGE SWARTZ, OF ALBANY, NEW YORK, ASSIGNOR OF ONE-HALF TO CHARLES H. ANDROS, OF NASSAU, NEW YORK

PROCESS AND APPARATUS FOR PREPARING CHARGES FOR POWER DEVICES

Application filed August 16, 1926. Serial No. 129,501.

My invention relates to the preparation of fuel charges for power devices, and particularly to the preparation of charges for internal combustion engines.

The fuel charge for an internal combustion engine ordinarily consists of atmospheric air and an atomized hydrocarbon. Air is a mixture of two gaseous elements, oxygen and nitrogen, in the proportion of about 23% oxygen and 77% nitrogen, by weight. Of these, it is well known that the oxygen is the only useful element in promoting combustion, and that the nitrogen, which comprises the greater proportion of the air, is inert. Water, on the other hand, consists of a chemical union of hydrogen and oxygen, in the proportion of about 89% oxygen and 11% hydrogen, by weight. Oxygen and hydrogen, when associated and subjected to a temperature above 1130 degrees F. will combine in the form of water vapor which, at the dew point, 212 degrees F., has a sensible heat value of 180 B. t. u. above 32 degrees F., and a latent heat value of 970 B. t. u.—a total heat value of 1150 B. t. u. above 32 degrees F.

At temperatures of and above 1000 degrees F. the oxygen of water vapor will combine with the carbon of a hydrocarbon, in the same manner as the oxygen of air, to form CO or $CO_2$. When such combination has been developed, the hydrogen in both the water vapor and in the hydrocarbon, will be set free and may be caused to combine with the oxygen of air to form another $H_2O$ combination as water vapor.

With these principles in mind, one of the objects of my invention is to produce a fuel charge consisting of water vapor, air and a hydrocarbon in such proportions and at such temperatures and under such conditions that the oxygen content of the water vapor will be sufficient to burn the carbon in the hydrocarbon to $CO_2$, and in which the oxygen content of the air will be sufficient to combine with the liberated hydrogen of the water vapor and the hydrocarbon to form a new $H_2O$ combination as water vapor.

Under ordinary present day practices, a great portion of the heat energy developed in the process of combustion is lost through the exhaust. I am, of course, aware that it has been proposed to utilize a part of this energy to vaporize water which is introduced into the intake manifold or to warm the air which is mixed with the hydrocarbon. These suggestions, so far as I am aware, contemplate the utilization of only a small part of the heat energy passing through the exhaust pipe. In other words, it has been proposed to utilize, in this way, a small part only of the "sensible heat" in the exhaust gases.

My process contemplates the utilization not only of the "sensible heat" above 212 degrees F. in the exhaust products, but also the latent heat. I propose to establish a heat transfer cycle in which the heat energy, both sensible and latent, in the exhaust gases is transferred to water and air and reconveyed to the combustion chamber with the fuel charge. I propose, by my process, to absorb in this way enough heat from the exhaust gases to reduce their temperature to below 212 degrees F., thus effecting a condensation of the water vapor in the exhaust gases and incidentally creating a vacuum effect in the exhaust circuit which will reduce back pressure on the pistons.

The thermal capacity of water vapor at ordinary atmospheric temperature is about 0.46, or about twice the thermal capacity of air. This being so, one of the objects of my invention is to produce a fuel charge having a greater thermal capacity than charges now ordinarily employed so that the initial compression of the charge may be greatly increased without developing compression ignition.

Another object of my invention is to produce a charge which will burn at a more uniform rate than charges now ordinarily employed, so that detonation is greatly reduced.

Another object is to provide a method and means for washing and heating the air to be introduced with the fuel into combination chambers and to reduce the quantity of inert nitrogen per unit of charge. I propose to accomplish this object broadly by substituting the oxygen of water vapor at high temperature for the oxygen of air in such a proportion as will combine in the combustion chamber with the incandescent carbon of the hydrocarbon vapor to form CO or $CO_2$, and to employ only such a quantity of air that its oxygen content, when superheated, will combine with hydrogen, developed from the decomposed hydrocarbon and water vapors to form $H_2O$.

Another object is to provide a means and method for collecting the water condensed from the exhaust products and returning it to the condenser to replace the water drawn into the combustion chamber in the form of vapor.

Another object is to reduce the volume of the exhaust gases and to remove obnoxious odors, smoke and other substances therefrom. I propose to accomplish this object broadly by water washing the gases before they are admitted to the atmosphere, and to accomplish this result in an economical manner, by utilizing for the purpose, the water condensed from the exhaust gases themselves.

Another and perhaps the primary object of my invention, is to provide a means and method for substantially increasing the efficiency of an internal combustion engine, by conserving and re-using the heat energy of the exhaust gases to develop a recurrent heat transfer from the combustion chamber to the exhaust pipe and thence back to the combustion chamber.

Still another object is to provide a method and apparatus whereby the hydrogen content of the fuel charges, as represented by the hydrogen content of both the hydrocarbon and the water vapor, is discharged from the combustion chambers in water vapor which is condensed and reconveyed to the combustion chambers in the form of water vapor, thus performing work as a carrier of heat energy to and from the combustion chamber, again and again.

Another object is to develop a multiple use of oxygen by first inducing it into combustion chambers in company with nitrogen as in air. Here, the oxygen combines with hydrogen of the decomposed hydrocarbon and water vapor to form $H_2O$ as steam. It then enters the exhaust circuit where the steam is condensed and conveyed to the condenser. Here, it is again vaporized and superheated by the exhaust gases, and as superheated steam, is induced into combustion chambers where the oxygen content combines with carbon to form carbonoxides, as CO or $CO_2$, and as such gaseous products, is dischraged to the atmosphere.

In accomplishing these and other objects I propose generally to utilize the sensible and latent heat in the exhaust products by reducing their temperature to below the condensation point. The heat thus abstracted from the exhaust products will be transmitted to water to form vapor, and to superheat a mixture of this water vapor and air to such a temperature as will vaporize a hydrocarbon fuel when mixed with it.

One form of the apparatus which may be used to perform my process is shown in a more or less typical manner in the accompanying drawings, in which—

Fig. 1 is a longitudinal, sectional view through the exhaust pipe or manifold;

Fig. 2 is a fragmentary enlarged section of Fig. 1 on the line 2—2; and

Fig. 3 is an enlarged section of the exhaust pipe on the line 3—3 of Fig. 1.

Referring to the drawings, 1, represents generally an internal combustion engine having the combustion chambers, 2, inlet passages, 3, and exhaust passages, 4. The exhaust gases emerge from the combustion chambers into the exhaust manifold, 5, which is bent downwardly as shown at, 6. This exhaust manifold, muffler and associated features can be arranged to suit the type of engine to which process is applied. The lower end of this pipe is closed, as shown at 7, but, for a considerable distance above the closed end, the walls thereof are perforated, as shown at 8, to permit the exhaust gases to flow and expand into chamber, 9. Chamber, 9, is closed at the upper end, as shown at 10, so that the exhaust gases must pass downwardly in the direction of the arrows. Surrounding chamber, 9, is a water jacket, 11, in which the water level, when the device is not operating, is maintained at about elevation, 12. The total depth, A, of water, however, must not be so great that the pistons cannot induce a flow of air therethrough, as hereinafter explained. Surrounding the lower and right hand part of the water jacket, 11, is the air passage, 13, through which air may be induced from the atmosphere. The water jacket is closed at the lower end by the diaphragm, 14, which, however, is provided with an opening, 15, through which the gases of combustion may pass downwardly through the elbow, 50, having perforated walls, into the chamber, 16. The chamber, 16, is provided with perforated diaphragms, 17 and 18, by means of which the gases are further broken up. Most of the perforations, in the diaphragms, 17 and 18, are above the water level, 19, in chamber, 16, although some are provided below to permit the water to maintain the same level throughout. The water, 20, which collects in chamber, 16, is condensed from the water vapor in the exhaust gases, and the gaseous products which are not condensed, must pass through this water before emerging into the atmosphere through the perforated diaphragm, 21.

The operation of the device is as follows:

When the motor is not in operation, the passages, 11 and 13, are filled with water up to the normal level, 12. The downward movement of the pistons will produce a rarefaction of the air in chamber, 11, above the water surface, 12. This rarefaction will cause air to flow through pipe, 31, into air passage, 13, and force the water downwardly in this passage and upwardly in the water jacket, 11, until the air has reached a point near the bottom of the air passage, 13. At this point, the air will be drawn upwardly through the water into the space above the water surface in chamber, 11. From here it will be drawn upwardly in the direction of the arrows about the hot exhaust manifold, 5, and into the pipe, 22, which leads to the carbureter, 23, (see Fig. 2). The air will then be drawn through the carbureter into the inlet passage, 3, and thence to the combustion chamber.

It will be evident that as the operation of the engine continues the exhaust gases will heat the water in the jacket, 12, to such a point that water vapor will be formed above the surface thereof. The atmospheric air which is drawn through the water will be heated, and as it emerges from the surface of the water it will pick up and be mixed with particles of water vapor. This mixture of air and water vapor will be superheated as it passes about the hot exhaust pipe on its way to the carbureter, so that a mixture of air and water vapor having a comparatively high temperature will be drawn through the carbureter.

The preheating of the air before its association with the water or water vapor, and the subsequent superheating thereof in the presence of water vapor, is quite important, because its capacity to absorb or carry water vapor is increased as its temperature rises. One pound of air, for example, will absorb about 105 grs. of water for each degree that its temperature is increased between 32 degrees F. and 212 degrees F., and at 202 degrees F., one pound of air will absorb or carry about 2.3 pounds of water.

In order to bring the particles of air into more intimate contact with the heated water, I propose to break it up into comparatively small jets or columns and to pass it through the water in comparatively fine streams. For this purpose a perforated plate or block, 51, may be provided at the bottom of the condenser through which the air must pass either in or into the water. The total area of the perforations being sufficient to permit all the air required to pass freely, and the distance between the perforations being sufficient to prevent an immediate rejoining of the columns or jets of air after passing the plate or block.

The water level in the water jacket may be maintained by means of the float valve, 24, which will regulate the flow of the water from the reservoir, 25. When the water in the jacket falls below the elevation, 12, the needle valve, 34, in the regulating device, 24, will be opened so as to admit water from the reservoir, 25.

The exhaust gases passing through the orifices, 8, in the pipe, 5, will be expanded and cooled by their contact with the water jacket, and the relative length of the water jacket should be adjusted in each case so that the temperature of the exhaust gases when they emerge from their contact with the water jacket will be about 212 degrees or less so that the water vapor therein will be condensed in chamber, 16. The water in reservoir, 25, may be automatically replenished from the condensation in chamber, 16, by means of the vacuum apparatus, 26, which in itself forms no part of this invention. It may be of the standard type now ordinarily used to draw gasolene from the tank to the carbureter of an automobile.

The amount of air flowing through pipe, 31, may be regulated by butterfly valve, 27, which, under some circumstances may be connected to the same lever which operates the butterfly valve, 28, between the carbureter and the intake manifold (see rod, 29, Fig. 1).

On account of the high thermal capacity of the fuel charge which contains a substantial quantity of water vapor, the initial compression may be raised to about 140 pounds per square inch without causing compression ignition. By reason of the high compression developed and by reason of the fact that when the engine is stopped, vapors may condense in the cylinders, thereby reducing the compression space, it is advisable to provide each combustion chamber with a compression release or safety valve, 30, which will relieve any overload pressure developed in the combustion chamber by permitting the gas to escape through orifice, 32, when the compression reaches a predetermined point. Thus, fracture of the piston or cylinder head is avoided.

Under some circumstances, particularly in starting, it may be advisable to draw the air directly to the carbureter without passing it through the heating and washing process. In this event a valve, 33, is provided in the intake manifold at an elevation above the water surface, 12, so that air may be drawn directly from the atmosphere at this point.

From a consideration of the foregoing in connection with the accompanying drawing, it will be apparent that the relative lengths of the water jacketed portion of the exhaust pipe and the air jacketed portion may be so designed for any particular motor that at least, under constant loads and speeds, a substantially perfect heat transfer cycle may be established. The length of the air jacket may be made such that the mixture of air and water vapor flowing in close proximity to the hot exhaust pipe may be heated to such a degree as will satisfactorily effect a vaporization of the hydrocarbon fuel. In this way the water vapor in the fuel charge may be heated to such a point that in the presence of incandescent carbon in the combustion chamber it will be readily decomposed and recombined into new combinations.

By passing this highly heated mixture of air and water vapor through the carbureter, it will be evident that very heavy hydrocarbons may be completely volatilized and all the elements of the fuel charge intimately mixed and associated in a gaseous form at high temperature.

It should be recognized that the suction of the pistons will raise the water level in the water jacket by the volume of water which will be forced downwardly in the air passage, 13, until the air reaches a point at or near the bottom of the water. In any given instance an allowance must be made in the design for this change in elevation of the water surface when the engine is operating.

By designing the condenser of such length that the exhaust gases, when they reach the opening in diaphragm, 14, are at the condensation point of the water vapor therein, not only the sensible heat of the gases above a temperature of 212 degrees F., but also the latent heat of evaporation, will have been absorbed by the condenser, from which it is reconveyed to the combustion chamber in the air and water vapor.

The water thus condensed from water vapor in the exhaust gases will be collected in the chamber, 16, and will rise to an elevation above the openings in the elbow, 50. The gaseous elements in the exhaust products which are not condensible will be forced to pass through this water of condensation before they can reach the atmosphere. In this way the gaseous products will be washed so that smoke, other substances, and the obnoxious odors associated therewith will be greatly reduced. And, because of the cooling of these gases and the condensation of the water vapor therein the volume expelled into the atmosphere will be very greatly reduced.

While I have described my invention in considerable detail it is to be understood that the words which I have used are words of description and not of limitation, and that the device as shown in the drawings may be modified in many respects without departing from the true scope and spirit of my invention as defined in the appended claims.

What I claim is:—

1. An internal combustion engine comprising an exhaust pipe, a carbureter, a water jacket about said pipe, means for directing the flow of air to the carbureter through the water in said jacket, means for cutting off or regulating the quantity of air so flowing, and means for admitting air to the carbureter without passing it through said water.

2. The method of increasing the efficiency of an internal combustion engine by utilizing the sensible and latent heat in the exhaust products which comprises cooling the exhaust products sufficiently to condense the water vapor therein by effecting a transfer of heat from said products to an enclosed body of water, creating an upward flow of air through said water to absorb the heat therefrom and convey vapor formed above the surface of said body of water to the combustion chamber of the engine, and thereafter intermixing an atomized hydrocarbon with the air and vapor.

3. The method of increasing the efficiency of an internal combustion engine by utilizing the sensible and latent heat in the exhaust products which comprises cooling the exhaust products sufficiently to condense the water vapor therein by transferring heat from said products to an enclosed body of water, creating an upward flow of air through the water to absorb the heat therefrom and convey the vapor formed above the surface of the water to the combustion chamber in association with an atomized hydrocarbon, and replacing the evaporated water from the condensation of the exhaust products.

4. The method of increasing the efficiency of an internal combustion engine by utilizing the latent heat in the exhaust products which comprises effecting a transfer of said latent heat to water and to the vapor developed from the heating of the water by said transfer and effecting a return of said heat to the combustion chamber of the engine by passing substantially all of the air, comprising part of the fuel charge, through said water and intermixing it with said heated vapor.

5. The method of increasing the efficiency of an internal combustion engine by utilizing the latent heat in the exhaust products which comprises effecting a transfer of said heat to water and to the vapor developed from the heating of the water by said transfer, and effecting a return of said heat to the combustion chamber of the engine by passing substantially all of the air, comprising part of the fuel charge, through said water and intermixing it with said vapor before intermixing the fuel therewith.

6. The method of preparing fuel charges for an internal combustion engine which comprises condensing the water vapor in the exhaust gases by effecting a transfer of the latent heat therein to water and to the vapor developed from the water by the heating thereof, passing the air to be incorporated in the fuel charge through said water and intermixing it with said vapor, intermixing a hydrocarbon with the air and water vapor to form the completed charge, and replacing the water removed as vapor in the charge by the water condensed from the exhaust gases.

7. In an internal combustion engine the combination with an exhaust pipe, of a carburetor, a condenser for condensing the water vapor in the exhaust gases passing through the exhaust pipe, means for conducting air to said carburetor through said condenser whereby water vapor is intermixed therewith, and means for conducting the water condensed from the exhaust gases to the condenser to replace the water removed therefrom with the air as water vapor.

8. An internal combustion engine comprising an exhaust pipe, means for effecting a condensation of the water vapor passing therethrough in the exhaust gases, means for collecting the water of condensation, and means for producing a flow of said water of condensation under atmospheric pressure from the collecting means to the first mentioned means.

9. In an internal combustion engine, a carbureter, an exhaust pipe, a water jacket surrounding a portion of said pipe, means for conveying substantially all the air to be passed through the carbureter through the water in said jacket, and means for breaking up the air passing through said water into small streams.

10. That step in the method of preparing fuel charges for and increasing the efficiency of an internal combustion engine which comprises preheating components of the charge by latent heat of the water vapor in the exhaust products of said engine.

11. The method of increasing the efficiency of an internal combustion engine by utilizing the latent heat energy in the water vapor contained in the exhaust gases which comprises condensing the water vapor by effecting a transfer of the latent heat and a portion of the sensible heat thereof to water and to the vapor developed from the heating of the water by said transfer, and effecting a return of said heat energy to the combustion chamber of the engine by passing substantially all of the air component of the fuel charge through said water and intermixing it with said vapor, associating a vaporized hydrocarbon therewith, and conveying the mixture to the combustion chamber.

12. In an internal combustion engine, the combination with means for condensing the water vapor in the exhaust gases from said engine to release the latent heat therein, of means for heating components of said charge by the heat so released.

13. In an internal combustion engine, an exhaust pipe having a portion relatively near the engine at a higher elevation than a portion relatively remote therefrom, means forming a water jacket about the lower portions and a vapor jacket about the higher portions of said pipe and a carburetor having an air intake communicating with the atmosphere through said jackets.

14. The method of increasing the efficiency of an internal combustion engine by utilizing the sensible and latent heat in the exhaust products which comprises cooling the exhaust products sufficiently to condense the water vapor therein by effecting a transfer of heat from said products to an enclosed body of water and to the vapor developed therefrom, intermixing the air to be incorporated in the fuel charge with the vapor so developed, superheating the mixture by heat absorbed from the exhaust products before the water vapor in said products is condensed, and thereafter intermixing a hydrocarbon with the superheated mixture of air and water vapor to form the fuel charge.

GEORGE SWARTZ.